(12) United States Patent
Kostov et al.

(10) Patent No.: US 9,909,412 B2
(45) Date of Patent: Mar. 6, 2018

(54) DETERMINING SEISMIC SENSOR ORIENTATION IN A WELLBORE

(71) Applicant: Schlumberger Technology Corporation, Sugar land, TX (US)

(72) Inventors: Clement Kostov, Houston, TX (US); Martin G. Luling, Paris (FR); Mark Puckett, Sceaux (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/655,719

(22) PCT Filed: Dec. 17, 2013

(86) PCT No.: PCT/US2013/075546
§ 371 (c)(1),
(2) Date: Jun. 25, 2015

(87) PCT Pub. No.: WO2014/105503
PCT Pub. Date: Jul. 3, 2014

(65) Prior Publication Data
US 2015/0337647 A1    Nov. 26, 2015

(30) Foreign Application Priority Data
Dec. 28, 2012    (EP) ..................... 12306710

(51) Int. Cl.
*E21B 47/09*    (2012.01)
*G01V 3/26*    (2006.01)
(Continued)

(52) U.S. Cl.
CPC ........ *E21B 47/091* (2013.01); *E21B 47/0905* (2013.01); *G01C 19/00* (2013.01);
(Continued)

(58) Field of Classification Search
CPC ... G01V 1/20; G01V 1/40; G01V 1/44; G01V 1/52; G01V 3/26; E21B 47/091; E21B 47/0905; G01C 19/00
(Continued)

(56) References Cited

U.S. PATENT DOCUMENTS 5,585,790 A * 12/1996 Luling ..................... G01B 7/31
340/853.8
6,076,260 A    6/2000 Williamson
(Continued)

OTHER PUBLICATIONS

General-Purpose Inclinometry Tool, Schlumberger Marketing, 2004, GPIT brochure, http://www.slb.com/~/media/Files/rd/technology/product_sheets/gpit_general_purpose_inclinometry_tool1.ashx, Aug. 2004.
(Continued)

*Primary Examiner* — Daniel L Murphy
(74) *Attorney, Agent, or Firm* — Michael Dae

(57) ABSTRACT

A well-logging tool includes a magnetic field logging tool and a borehole seismic array, which includes a plurality of seismic sensor devices coupled together in series. Each seismic sensor device includes a sensor housing and at least one seismic sensor carried by the sensor housing. A magnetometer is carried by the sensor housing to sense the local magnetic field. A controller cooperates with the magnetic field logging tool to generate a log of the local magnetic field relative to the true earth geographic pole. The controller cooperates with the borehole seismic array to determine an orientation of each seismic sensor device based upon the respective sensed local magnetic field and log of the local magnetic field relative to the earth geographic pole.

15 Claims, 3 Drawing Sheets

(51) Int. Cl.
*G01V 1/44* (2006.01)
*G01V 1/52* (2006.01)
*G01C 19/00* (2013.01)
*G01V 1/20* (2006.01)
*G01V 1/40* (2006.01)

(52) U.S. Cl.
CPC .................. *G01V 1/20* (2013.01); *G01V 1/40* (2013.01); *G01V 1/44* (2013.01); *G01V 1/52* (2013.01); *G01V 3/26* (2013.01)

(58) Field of Classification Search
USPC ............................................ 367/25; 324/346
See application file for complete search history.

(56) References Cited

U.S. PATENT DOCUMENTS

| | | |
|---|---|---|
| 6,173,773 B1 | 1/2001 | Almaguer et al. |
| 6,487,782 B1 | 12/2002 | Bond |
| 6,713,923 B2 | 3/2004 | Hino et al. |
| 7,588,082 B2 | 9/2009 | Lasater |
| 7,757,755 B2 | 7/2010 | Kenison et al. |
| 2004/0073369 A1 | 4/2004 | McElhinney |
| 2005/0279532 A1 | 12/2005 | Ballantyne et al. |
| 2008/0156485 A1 | 7/2008 | Phillips et al. |
| 2008/0316860 A1 | 12/2008 | Muyzert et al. |
| 2009/0217539 A1 | 9/2009 | Blake |

OTHER PUBLICATIONS

P. Armstrong, "Model-based relative bearing estimation for a downhole multicomponent sensor array," 2009, SEG expanded abstracts.

M. Becquey and M. Dubesset, "Short Note: Three-component sound orientation in a deviated well," Geophysics, vol. 55, No. 10, 1990, pp. 1386-1388.

F. Grigoli, S. Cesca, T. Dahm, "A complex linear least-squares method to derive relative and absolute orientations of seismic sensors," Geophysical Journal International, 188, 2012, pp. 1243-1254.

W.A. Morris, H. Ugalde, J. Mwenifumbo, "Borehole magnetics navigation: An example from the Stratmat Deposit, Bathurst," New Brunswick, The Leading Edge, vol. 27, No. 1, 2008, pp. 106-111.

J. Almaguer, et al., "Orienting perforations in the right direction," 2002, Oilfield Review, Spring 2002, vol. 14, Issue 1.

International Preliminary report on patentability issued in the related PCT application PCT/US2013/075546, dated Jul. 29, 2014 (11 pages).

International Search Report and Written Opinion issued in the related PCT application PCT/US2013/075546, dated Jun. 30, 2015 (7 pages).

Extended Search Report issued in the related EP application 12306710.0, dated Apr. 2, 2013 (8 pages).

Versatile Seismic Imager (VSI) Brochure, VSI Versatile Seismic Imager, Sep. 2002 (6 pages).

* cited by examiner

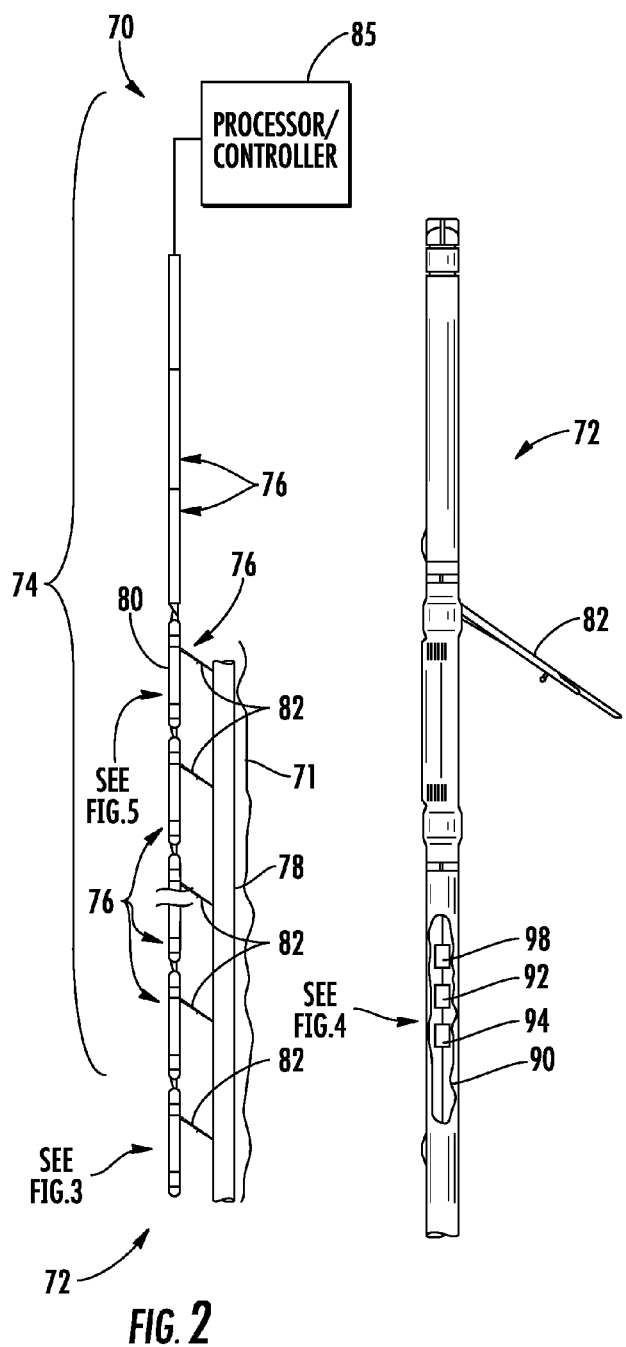
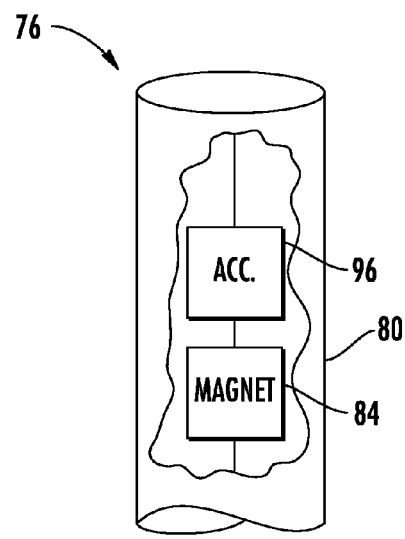
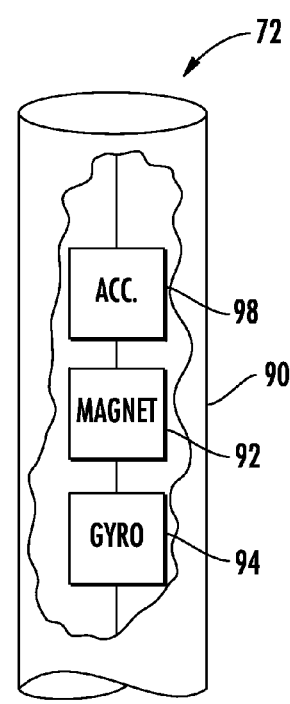
FIG. 2
FIG. 3
FIG. 4
FIG. 5

DETERMINING SEISMIC SENSOR ORIENTATION IN A WELLBORE

BACKGROUND

Well-logging instruments are used in wellbores to make, for example, formation evaluation measurements to infer properties of the formations surrounding the borehole and the fluids in the formations. Such well-logging instruments may include electromagnetic instruments, acoustic-sonic instruments, and other instruments, for example.

For borehole seismic surveys, multi-level arrays of seismic sensor devices are coupled in series and include receivers sensitive to such factors as velocity, acceleration and pressure. Properties of a seismic wavefield are measured, and it is important to know the location of the sensor, and with a vector measurement, the orientation of the sensor. Thus, the sensor location and orientation should be known. Sensor orientation has been estimated using seismic data and assumptions about energy propagation in the earth from the source to receivers. These borehole seismic arrays discriminate the propagation direction of acoustic and elastic waves. For this reason, the absolute orientation of the seismic sensors is desired. In one example, the borehole seismic arrays include flexible interconnects between the seismic sensors (also termed shuttles), where each seismic sensor rotates independently with respect to others or include stiff bridles that enforce consistent orientation between the sensors, albeit with some unknown long-range torsion. Even with stiff bridles, the absolute orientation of the array remains unknown.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A well-logging system for a geological formation has a borehole with a local magnetic field associated therewith and includes a magnetic field logging tool to be positioned within the borehole. A borehole seismic array is positioned within the borehole and includes a plurality of seismic sensor devices coupled together in series. Each seismic sensor device includes a sensor housing and at least one seismic sensor carried by the sensor housing. A magnetometer is carried by the sensor housing to sense the local magnetic field. A controller cooperates with the magnetic field logging tool to generate a log of the local magnetic field relative to the true up-down direction and a true north-south direction of the earth's geographic north pole. The controller cooperates with the borehole seismic array to determine an orientation of each seismic sensor device based upon the respective sensed local magnetic field and log of the local magnetic field relative to the earth geographic north pole.

In one example, the magnetic field logging tool includes a tool housing, a magnetometer carried by the tool housing and a gyroscope carried by the tool housing. In another example, the magnetic field logging tool is coupled at the head of the borehole seismic array. Each seismic sensor device may include an inclinometer carried by the sensor housing to sense the earth gravity field. The controller determines the orientation of each seismic sensor also based on the earth gravity field. In an example, the inclinometer is formed as a triaxial accelerometer. The controller also determines the orientation of each seismic sensor device at each level of depth thereof. Adjacent seismic sensor devices may be relatively rotatable. A casing made of magnetic iron may line the borehole. Such casing may severely distort the earth magnetic field, however, even the distorted magnetic field inside casing will be constant in time during the survey duration.

In another example, a well-logging tool for geological formation having a borehole with a local magnetic field associated therewith includes a magnetic field logging tool to be positioned within the borehole to generate a log of the local magnetic field relative to the true geographic north of the earth. A borehole seismic array is positioned within the borehole and coupled to the magnetic field logging tool. The borehole seismic array includes a plurality of seismic sensor devices coupled together in series and each including a sensor housing, at least one seismic sensor carried by the sensor housing and a magnetometer carried by the sensor housing to sense the local magnetic field. A well-logging method is also disclosed.

BRIEF DESCRIPTION OF THE DRAWINGS

FIG. 2 is a schematic diagram of a well-logging tool having a borehole seismic array and magnetic field logging tool as an example embodiment that can be used with the well-logging system shown in FIG. 1.

FIG. 3 is an enlarged view of the magnetic field logging tool shown in FIG. 2 as an example embodiment.

FIG. 4 is an enlarged view of the cut away section shown in FIG. 3 of the magnetic field logging tool and showing components in an example embodiment.

FIG. 5 is an enlarged view of the cut away section shown in FIG. 2 of a seismic sensor device showing components in an example embodiment.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
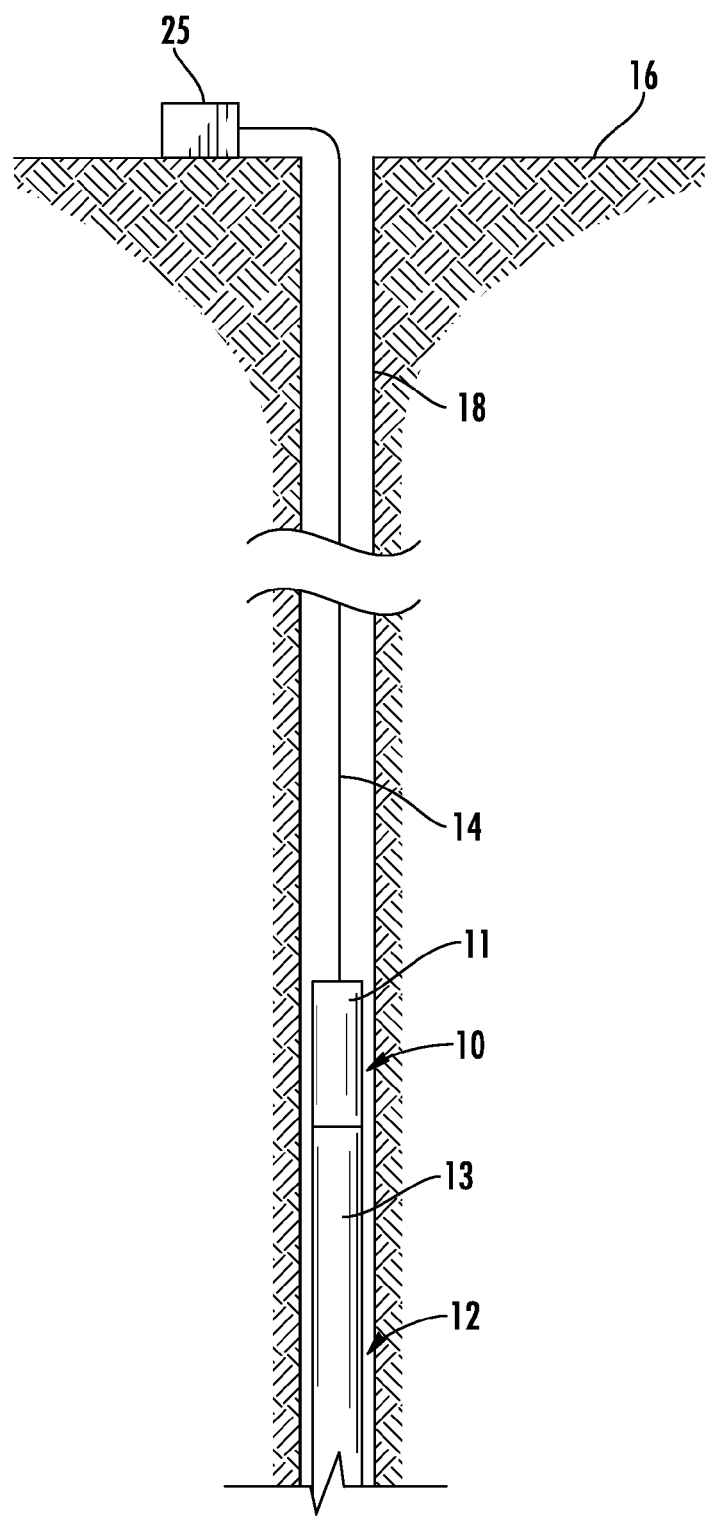
FIG. 1 is a schematic diagram illustrating a wireline well-logging system in accordance with an example embodiment.

FIG. 1 shows a cable head 10 connected at its lower end to a logging tool 12. An upper end of the cable head 10 is secured to a wireline cable 14 in this embodiment. The wireline cable extends to the surface 16 of a well or hole 18 and is operable to lower the cable head 10 and logging tool 12 down to an area where formations and parameters are determined and recorded during logging operations. A vertical well 18 is shown but it should be understood that it can be highly deviated or even horizontal in another example. During a logging operation, data are transmitted from the logging tool 12 to the wireline cable 14 through the cable head 10. Within the wireline cable 14, the data are transmitted to a data-transmission and acquisition system 25 at the surface 16. The cable head 10 is exposed to high temperature and high pressure downhole environments, including environmentally harsh downhole fluids. In this example, a tubular member 11 forms the cable head 10 and one or more tubular members 13 form a logging tool 12. Both tubular members 11, 13 are insertable in the well. FIG. 2 shows greater details of a logging tool for seismic sensing and system for determining seismic sensor orientation.

FIG. 2 illustrates a well-logging tool 70 inserted within a borehole 78 that includes a casing 71 that may line the borehole as illustrated. The well-logging tool is part of a well-logging system and determines the orientation of different seismic sensor devices 76 that are connected together in series to form a borehole seismic array illustrated generally at 74. A magnetic field logging tool 72 is coupled at the head of the borehole seismic array as illustrated in FIG. 2 and shown in an enlarged view in FIG. 3. The magnetic field logging tool 72 cooperates with the seismic sensor devices in a tool string and determines the orientation of each seismic sensor device 76. Sensor orientation information is used to determine different coordinates. The local magnetic field is affected by the casing and does not give true north. A gyroscope is used for true north. The system, in an example, determines the direction of the local field versus the true north.

The well-logging tool 70 is illustrated in FIG. 2 and positioned within the borehole 71 and includes a borehole seismic array 74 having a plurality of seismic sensor devices 76 that are coupled together in series. The borehole 71 may have a casing 78 lining the borehole 71. Each seismic sensor device 76 includes a sensor housing 80 as shown in FIGS. 2 and 5 and at least one seismic sensor 82 carried by the sensor housing. As shown in the enlarged cut away view of FIG. 5 for the sensor device 76, a magnetometer 84 is carried by the sensor housing 80 and senses the local magnetic field. A processor/controller 85 cooperates with the magnetic field logging tool 72 and in this example is contained within the array 74 to generate a log of the local magnetic field relative to the earth true geographic north, as determined with the gyroscope. The controller also cooperates with the borehole seismic array 74 to determine an orientation of each seismic sensor device 76 based upon the respective sensed local magnetic field and the log of the local magnetic field relative to the earth true geographic north.

The illustrated magnetic field logging tool 72 may be formed as a modified seismic sensor device as illustrated with the sensor 82 and includes a tool housing 90 and a magnetometer 92 carried by the tool housing. A gyroscope 94 is carried by the tool housing. This magnetic field logging tool 72 is coupled at the head of the borehole seismic array 74 as illustrated in this example. Each seismic sensor device 76 includes an inclinometer 96 (FIG. 5) carried by each sensor housing 80 to sense an earth gravity field. In an example, the controller 85 determines the orientation of each seismic sensor device 76 based upon the earth gravity field. In an example, the inclinometer 96 is formed as a triaxial accelerometer. Adjacent seismic sensor devices 76 are relatively rotatable with respect to each other. The magnetic field logging tool 72 also may include an inclinometer/accelerometer 98. Two vector fields are measured continuously with the combined gyroscope 94 from the magnetic field logging tool 72 and the triaxial accelerometers and magnetometers during deployment. Each seismic sensor device 76 is co-located with a triaxial accelerometer 96 and magnetometer 84 to measure the local gravity and magnetic fields. The controller 85 may relate the local magnetic field to the stable direction using a previously recorded downhole gyroscope 94 to provide knowledge of the orientation of each seismic sensor device 76. The seismic sensor device orientation data is used to compute data in different coordinate frames. This local orientation measurement for each seismic sensor device offers reduced position-orientation errors and saves time in the data processing and reduces uncertainty in the data processing and thus improves accuracy.

Figure 6:
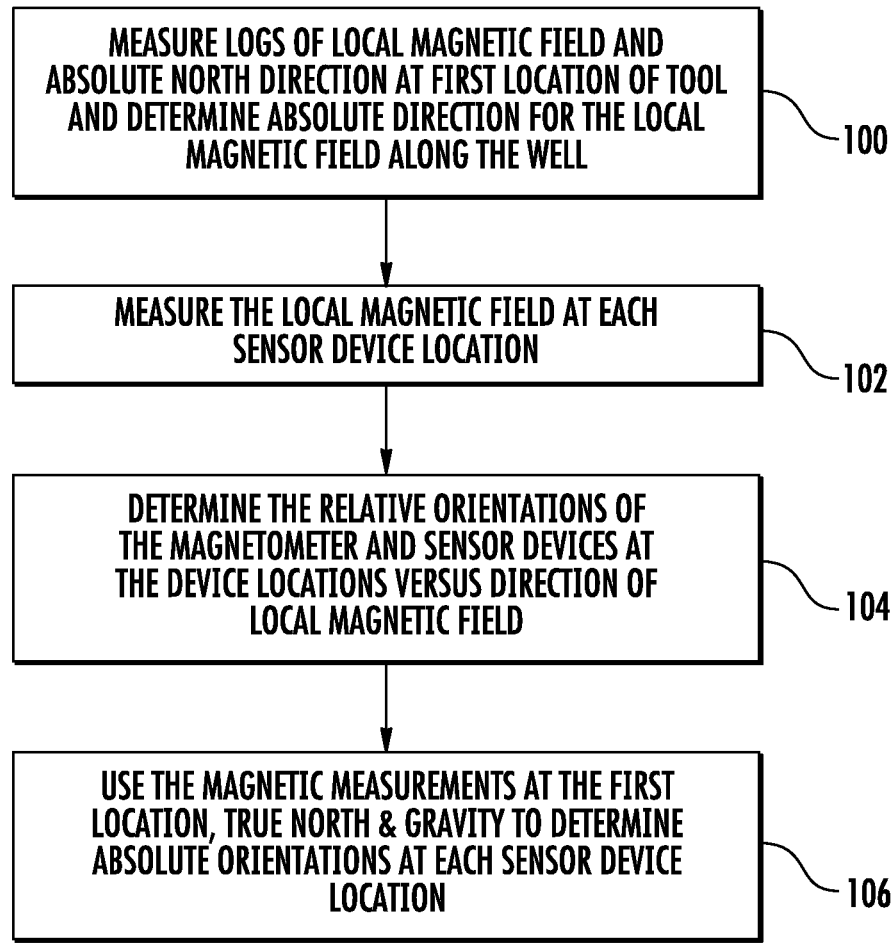
FIG. 6 is a high-level flowchart showing a method of using the well-logging tool to determine orientation in the borehole in an example embodiment.

FIG. 6 is a high-level flowchart showing a method using the well-logging system to determine orientation in an example embodiment.

As shown at block 100, the logs of a local magnetic field are measured and the absolute north directions are made for the tool at a first location. The absolute direction for the local magnetic field is determined along the wellbore. A magnetometer is used to measure the local magnetic field and the gyroscope determines absolute north direction. As shown at block 102, the local magnetic field is measured at each sensor device for the respective location of the sensor device. Magnetometers are used.

As shown at block 104, the relative orientations of the magnetometer and sensor devices at their respective locations are determined versus the direction of the local magnetic field. At block 106, the magnetic measurements at the first location are used together with true north and gravity to determine the absolute orientations at each sensor device location.

Each seismic sensor device 76 can be formed from a Versatile Seismic Imager (VSI) that uses three-axis, single sensor seismic hardware and software and advanced wireline telemetry for efficient data delivery from the borehole to the surface. Each seismic sensor device delivers high-fidelity wavefields through the use of three-axis geophone accelerometers, which are acoustically isolated from the main body of a tool. The number of sensors, intersensor spacing, connection type as either stiff or flexible and tool diameter are field configurable to ensure versatility.

As illustrated in FIG. 5, each seismic sensor device 76 is shown as having a three-axis accelerometer 96 and magnetometer 84 to measure parameters such as tool deviation, tool azimuth and relative bearing. It defines accurately the tool system axis with respect to the earth's gravity (G) and the local, possibly distorted magnetic field (F). It should be understood that the local magnetic field is not the earth field, but a distorted field. The magnetometer, co-located with the gyroscope, determines the relative orientation of the local, distorted magnetic field with respect to true up-down from gravity and true north from the gyroscope. The magnetometer may determine the $F_x$, $F_y$ and $F_x$ and the inclinometer determines $A_x$, $A_y$, and $A_x$ for acceleration due to G.

In one example, each seismic sensor device 76 includes a three-axis omnitilt geophone accelerometer with a flat response from about 3 to about 200 Hz. These provide excellent response in a borehole seismic band. The decoupled design of this tool 70 that incorporates seismic sensor devices enable the use of long tool strings without acoustical degradation, and in one example, as many as 20 tools can be combined to obtain rapid, efficient multi-level seismic surveys. It is possible to combine the tool with a gamma ray tool and a separate tool for spatial orientation and other auxiliary sensor tools.

The accelerometers 96 will work in a cased well, but it is known that magnetometers 84 are impaired by the casing that is often magnetic, whether it is the distortion of the local-magnetic field or the superposition of the parasitic magnetic field from magnetized casing sections. The inside of the casing 78 may have a local magnetic field that bears little resemblance to the true north-south direction that the earth-magnetic field should provide. The well-logging tool 70 measures the magnetic field with a reasonably high sampling density and corrects its random orientation back to a correct north-south direction. The seismic sensor devices 76 as part of the borehole seismic array 74 may be oriented and the data processed. The triaxial accelerometers 96 and magnetometers 84 are co-located in each seismic sensor device 76. The accelerometers 84 determine up-down from the gravity unaffected by the casing and the magnetometers 84 measure the local magnetic field that is a combination of the distorted earth magnetic field and parasitic casing magnetization. The gyroscope 94 is carried by the magnetic field logging tool 72 as explained above, and in one example, is positioned at the head of the array to measure the north-south direction and its data combined with a co-located triaxial magnetometer 92 to determine the local magnetic field at each point along the case well during the borehole seismic array. As noted before, it may include the accelerometer 98.

The magnetic field-orientation log against north-south is used with the magnetometers at each seismic sensor device 76 to determine the sensor orientation against north-south and permits the controller 85 to rotate each seismic sensor device. This rotation may eliminate or reduce orientation errors in overall data-conditioning and data-processing. This allows any borehole seismic (BHS) arrays as the borehole seismic array illustrated in FIG. 2 to offer multi-axis measurements that require the external orientation with the system as described. In one example, the relative orientations of sensors within the array are rigidly fixed and it is necessary to orient the array. As described before, each seismic sensor device includes accelerometers and magnetometers and may contain other sensors for measuring acceleration from passing seismic waves for pressure.

A temperature gauge may be included to calibrate other measurements as a function of temperature. The triaxial accelerometers as described determine that the vector-value direction of gravity is up-down and is unaffected by the casing in the borehole. The magnetometers measure vector-valued earth magnetic field and are distorted inside the steel casing, which may even be randomly magnetized as described above. The magnetometers within each seismic sensor device may be used for local orientation measurements as described above and the magnetic field logging tool as shown in FIGS. 2, 3 and 4 and used with the gyroscope at the head of the array, i.e., the bottom end that first enters the borehole in this example.

The gyroscope maintains its orientation throughout the array deployment and accurately measures any change in orientation of the borehole axis. As the borehole seismic array that includes the magnetic field logging tool is lowered into the well, the accelerometers and gyroscope accurately measure the well trajectory independent of environmental influences. The magnetometer of each sensor device measures the local magnetic field orientation. Because the sensors are rigidly combined in one example, the combination measurement determines the vector-valued magnetic field orientation at any point inside the casing against up-down from the accelerometers and north-south from the gyroscope. The head of the array having the magnetic field logging tool provides a continuous magnetic field orientation log during the deployment process. Thus, each seismic sensor device includes accelerometers determining up-down and a magnetometer determining local magnetic field direction that has been logged against the gyroscope of the magnetic field logging tool. It is possible to make an auxiliary depth measurement to correlate local magnetic fields, one from the magnetometers at the seismic sensor devices and the other from the established reference local field. A suitable trigonometry algorithm rotates the local magnetic field measured at a seismic sensor device so that it matches the local magnetic field measured earlier with the magnetometer coupled to the gyroscope as shown in FIG. 4.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A well-logging system for a geological formation having a borehole (78) with a local magnetic field associated therewith, the well-logging system characterized by:
    a magnetic field logging tool (72) to be positioned within the borehole, including at least a magnetometer and a gyroscope;
    a borehole seismic array (74) to be positioned within the borehole and comprising a plurality of seismic sensor devices (76) coupled together in series, each seismic sensor device comprising
    a sensor housing (80),
    at least one seismic sensor (82) carried by said sensor housing, wherein the seismic sensor is used to determine at least a property of a seismic wavefield, and
    a magnetometer (84) carried by said sensor housing to determine a relative orientation of the sensor at its location versus the direction of the local magnetic field; and
    a controller (85) to
        cooperate with said magnetic field logging tool (72) to generate a log of the local magnetic field relative to a true up-down direction and a true north-south direction of the geographic north pole, and
        cooperate with said borehole seismic array (74) to determine an absolute orientation of each seismic sensor device based upon the respective sensed local magnetic field and the log of the local magnetic field relative to the Earth geographic north pole.

2. The well-logging system according to claim 1 wherein said magnetic field logging tool comprises:
    a tool housing (90);
    a magnetometer carried by said tool housing (90); and
    a gyroscope (94) carried by said tool housing.

3. The well-logging system according to claim 1 wherein said magnetic field logging tool (72) is coupled at the head of said borehole seismic array.

4. The well-logging system according to claim 1 wherein each seismic sensor device (76) comprises an inclinometer (96) carried by said sensor housing to sense an Earth gravity field; and wherein said controller determines the orientation of each seismic sensor also based upon the Earth gravity field.

5. The well-logging system according to claim 4 wherein said inclinometer comprises a triaxial accelerometer (96).

6. A well-logging tool (72) for a geological formation having a borehole (78) with a local magnetic field associated therewith, the well-logging tool characterized by:
    a magnetic field logging tool (72) including at least a magnetometer and a gyroscope to be positioned within the borehole to generate a log of the local magnetic field relative to a true up-down direction and a true north-south direction of the geographic north;
    a borehole seismic array (74) to be positioned within the borehole and coupled to said magnetic field logging tool, said borehole seismic array comprising a plurality of seismic sensor devices (76) coupled together in series, each seismic sensor device comprising a sensor housing (80), at least one seismic sensor (82) carried by said sensor housing, wherein the seismic sensor is used to determine at least a property of a seismic wavefield, and a magnetometer (84) carried by said sensor housing to determine a relative orientation of the sensor at its location versus the direction of the local magnetic field; and a controller for determining an absolute orientation of each seismic sensor device based upon the respective sensed local magnetic field and the log of the local magnetic field relative to the Earth geographic north pole.

7. The well-logging tool according to claim 6 wherein said magnetic field logging tool (72) comprises:

a tool housing (90);

a magnetometer (92) carried by said tool housing; and a gyroscope (94) carried by said tool housing.

8. The well-logging tool according to claim 6 wherein said magnetic field logging tool (72) is coupled at the head of said borehole seismic array (74).

9. The well-logging tool according to claim 6 wherein each seismic sensor device (76) comprises an inclinometer (96) carried by said sensor housing to sense an Earth gravity field.

10. The well-logging tool according to claim 9 wherein said inclinometer comprises a triaxial accelerometer.

11. A well-logging method for a geological formation having a borehole (80) with a local magnetic field associated therewith, the well-logging method characterized by:

positioning a magnetic field logging tool (72) including at least a magnetometer and a gyroscope within the borehole;

positioning a borehole seismic array (74) within the borehole and comprising a plurality of seismic sensor devices (76) coupled together in series, each seismic sensor device comprising a sensor housing (80), at least one seismic sensor (82) carried by the sensor housing, wherein the seismic sensor is used to determine at least a property of a seismic wavefield, and a magnetometer (84) carried by the sensor housing to determine a relative orientation of the sensor at its location versus the direction of the local magnetic field; and operating a controller (85) to cooperate with the magnetic field logging tool (72) to generate a log of the local magnetic field relative to a true up-down direction and a true north-south direction of the geographic north pole, and cooperate with the borehole seismic array (74) to determine an absolute orientation of each seismic sensor device based upon the respective sensed local magnetic field and the log of the local magnetic field relative to the Earth geographic north pole.

12. The method according to claim 11 wherein the magnetic field logging tool (72) is coupled at the head of the borehole seismic array during positioning within the borehole.

13. The method according to claim 11 wherein each seismic sensor device (76) comprises an inclinometer (96) carried by the sensor housing to sense an Earth gravity field; and wherein operating the controller comprises operating the controller to determine the orientation of each seismic sensor also based upon the Earth gravity field.

14. The method according to claim 11 wherein adjacent seismic sensor devices are relatively rotatable.

15. The method according to claim 11 wherein the borehole has a casing (71) therein.

* * * * *